United States Patent
Velusamy et al.

(10) Patent No.: US 10,412,648 B1
(45) Date of Patent: Sep. 10, 2019

(54) IDLE-MODE HANDOFF CONTROL IN WIRELESS DATA COMMUNICATION NETWORKS

(71) Applicant: Sprint Communications Company L.P., Overland Park, KS (US)

(72) Inventors: Saravana Velusamy, Overland Park, KS (US); Rajil Malhotra, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 32 days.

(21) Appl. No.: 15/408,993

(22) Filed: Jan. 18, 2017

(51) Int. Cl.
*H04W 36/14* (2009.01)
*H04W 84/04* (2009.01)

(52) U.S. Cl.
CPC .......... *H04W 36/14* (2013.01); *H04W 84/045* (2013.01)

(58) Field of Classification Search
CPC ............................ H04W 36/14; H04W 84/045
See application file for complete search history.

(56) References Cited

U.S. PATENT DOCUMENTS

| | | |
|---|---|---|
| 8,537,779 B2 | 9/2013 | Wu |
| 8,655,374 B2 | 2/2014 | Vikberg et al. |
| 8,744,439 B2 | 6/2014 | Deivasigamani et al. |
| 8,787,314 B2 | 7/2014 | Wu |
| 9,148,825 B2 | 9/2015 | Choi et al. |
| 9,344,959 B2 | 5/2016 | Klatt et al. |
| 9,491,612 B2 | 11/2016 | Cho et al. |
| 2011/0206013 A1* | 8/2011 | Aramoto ............... H04W 36/26 370/332 |
| 2012/0134346 A1 | 5/2012 | Bosch et al. |
| 2012/0155391 A1* | 6/2012 | Kim ....................... H04W 56/00 370/255 |
| 2014/0016614 A1 | 1/2014 | Velev et al. |
| 2014/0071856 A1* | 3/2014 | Brisebois ............... H04W 56/00 370/255 |
| 2014/0073327 A1* | 3/2014 | Le Rouzic ............ H04W 36/14 455/436 |
| 2014/0092871 A1 | 4/2014 | Wang et al. |
| 2016/0029278 A1* | 1/2016 | Poikonen ............... H04W 36/12 370/331 |
| 2016/0255539 A1* | 9/2016 | Mizukoshi ............ H04W 36/14 455/436 |

FOREIGN PATENT DOCUMENTS

WO 2015106525 7/2015

* cited by examiner

*Primary Examiner* — Jianye Wu

(57) ABSTRACT

A wireless communication network controls idle-mode handovers for User Equipment (UE). A network controller receives a Tracking Area Update (TAU) from the UE that indicates an idle-mode handover from a source Tracking Area (TA) to a target TA and transfers an authorization request indicating the target TA. An authorization database processes the authorization request to authorize the UE to use the target TA and returns a TA authorization result. When the authorization result is positive, the network controller transfers a create bearer message for the UE to a network gateway. When the authorization result is negative, the network controller transfers a TAU rejection to the UE without transferring the create session message to the network gateway. The TAU may indicate a target Public Land Mobile Network (PLMN), and the authorization database authorizes the UE to use the target PLMN to authorize the UE to use the target TA.

14 Claims, 6 Drawing Sheets

IDLE-MODE HANDOFF CONTROL IN WIRELESS DATA COMMUNICATION NETWORKS

TECHNICAL BACKGROUND

Data communication systems exchange user data for user devices to provide various data communication services. The user devices may be phones, computers, media players, and the like. Wireless base stations are used to extend the range and mobility of the data communication services to the wireless user devices. The wireless base stations are geographically grouped into tracking areas. The tracking areas are used to manage the user devices by general geographic location.

A popular wireless networking protocol is Long Term Evolution (LTE). In LTE networks, user devices wirelessly attach to LTE base stations referred to as evolved Node Bs. The LTE base stations transmit their tracking area IDs to the user devices that they serve. The LTE tracking area IDs include corresponding Public Land Mobile Network (PLMN) IDs. The base stations signal LTE Mobility Management Entities (MMEs) of the attachment and indicate the PLMN IDs. The MMEs access a Home Subscriber System (HSS) database to determine if the user devices are authorized to use their PLMN attachments. If the HSS database returns a PLMN rejection, then the MME notifies the user device and the attachment is blocked. If the HSS database returns a PLMN acceptance, then the MME directs a Serving Gateway (S-GW) to establish a default data bearer for the user device in the attached PLMN.

At some point, the user device may perform an idle-mode handover from its source base station to a target base station. In idle-mode, the user device has default data bearers but no dedicated data bearers. After the idle-mode handover, the user device will report any change in the tracking area ID to its MME in a tracking area update. In response to this tracking area update, the MME directs a new S-GW to establish a new default data bearer for the user device in the new tracking area.

After the new default data bearer is established, the MME accesses the HSS database to determine if the user device is authorized to use the new tracking area. If the HSS database returns a tracking area acceptance, then the MME transfers a tracking area acceptance to the user device over the target base station. If the HSS database returns a tracking area rejection, then the MME signals the S-GW to remove the new default data bearer and transfers a tracking area rejection to the user device. The use of the new tracking area is blocked.

Wireless data communication networks are currently densifying with wireless relays like pico-cell and femto-cell base stations. The pico-cell and femto-cell base stations may use different tracking areas and/or PLMNs from the macro-cell base stations. Due to the internal nesting of these densified base stations, the number of idle-mode handovers is increasing. Unfortunately, not all user devices are authorized to use all the densified PLMNs. Due to the handovers to unauthorized PLMNs, the S-GWs and P-GWs initiate an increasing number of user data bearers that go unused and are later removed.

TECHNICAL OVERVIEW

A wireless communication network controls idle-mode handovers for User Equipment (UE). A network controller receives a Tracking Area Update (TAU) from the UE that indicates an idle-mode handover from a source Tracking Area (TA) to a target TA and transfers an authorization request indicating the target TA. An authorization database processes the authorization request to authorize the UE to use the target TA and returns a TA authorization result. When the authorization result is positive, the network controller transfers a create bearer message for the UE to a network gateway. When the authorization result is negative, the network controller transfers a TAU rejection to the UE without transferring the create session message to the network gateway. The TAU may indicate a target Public Land Mobile Network (PLMN), and the authorization database may authorize the UE to use the target PLMN to authorize the UE to use the target TA.

DETAILED DESCRIPTION

Figure 1:
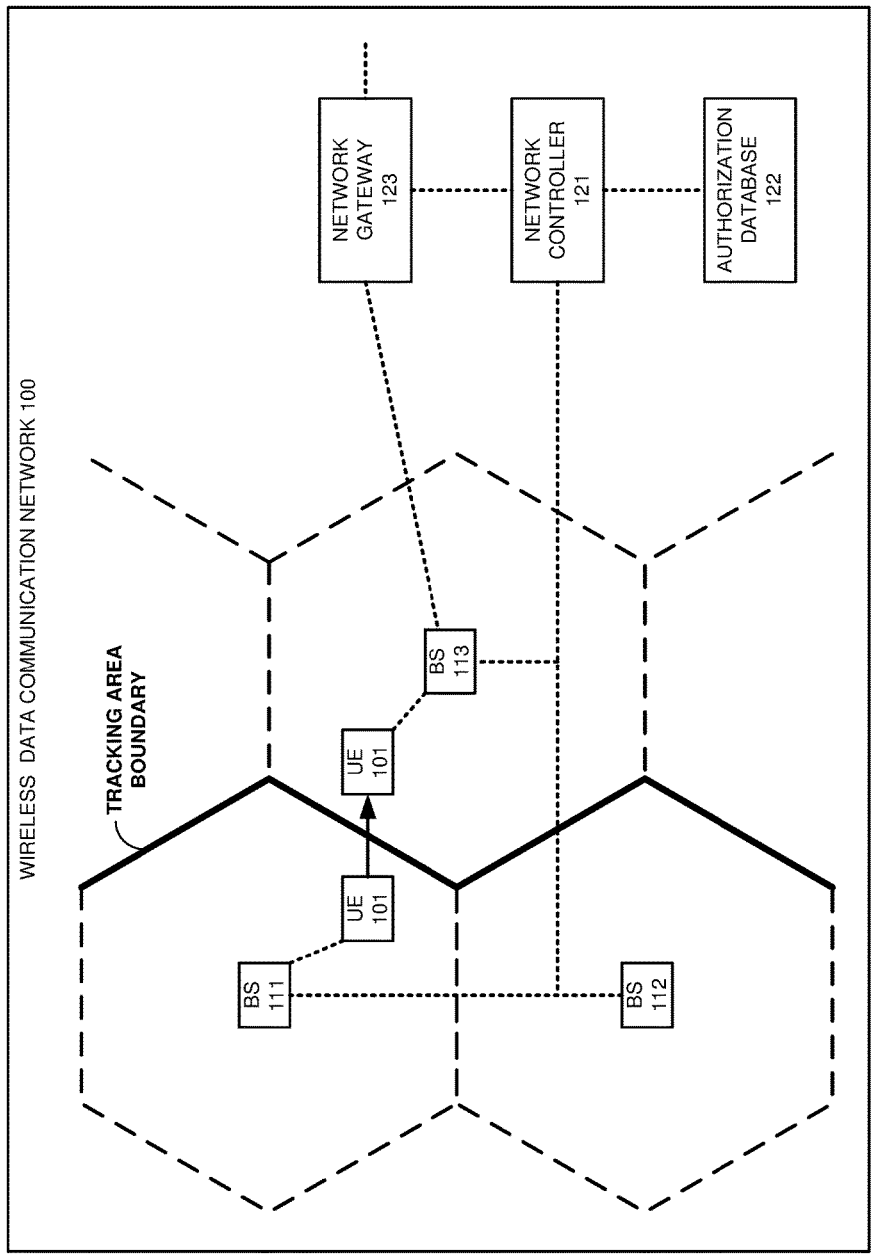
FIG. 1 illustrates a wireless data communication network to control an idle-mode handover for a User Equipment (UE).

FIG. 1 illustrates wireless data communication network 100 to control an idle-mode handover for User Equipment (UE) 101. Wireless data communication network 100 includes UE 101, base stations (BS) 111-113, network controller 121, authorization database 122, and network gateway 123. UE 101 could be a phone, computer, or some other machine that has wireless communication components. UE 101 comprises computer hardware like Central Processing Units (CPUs), Random Access Memory (RAM), persistent data storage, bus interfaces, and data transceivers. The data transceivers include wireless communication devices like antennas, amplifiers, filters, modulators, and signal processors. UE 101 also has computer software like operating system, networking, application, and the like.

Base stations 111-113 could be macro-cell base stations, pico-cell base stations, femto-cell base stations, wireless relays, or some other computer coupled to wireless communication components. Wireless access points 111-113 comprise computer hardware like CPUs, RAM, persistent data storage, bus interfaces, and data transceivers. The data transceivers include wireless communication devices like antennas, amplifiers, filters, modulators, and signal processors. Wireless access points 111-113 also have computer software like operating system, networking, backhaul interface, and the like.

Network controller 121 comprises a computer and software that could be integrated with other network elements. For example, network controller 121 could be a Mobility Management Entity (MME) Virtual Network Function (VNF) in a Network Function Virtualization (NFV) computer system that also hosts various network element VNFs.

Authorization database 122 comprises a computer and software that could be integrated with other network elements. For example, authorization database 122 could be a Home Subscriber System (HSS) VNF in the NFV computer system.

Network gateway 123 comprises a computer and software. The software performs tasks like Dynamic Host Control Protocol (DHCP), routing, firewall, Network Address Translation (NAT), quality and charging enforcement, packet inspection, and the like. For example, network gateway 123 could be Serving Gateway (S-GW) VNFs and Packet Data Network Gateway (P-GW) VNFs in an NFV computer system.

On FIG. 1, base stations 111-113 are centered in respective hexagonal coverage areas that are indicates by dashed lines. A tracking area boundary that is indicated by a heavy solid line that separates the coverages areas of base stations 111-112 from the coverage area of base station 113. Initially, UE 101 wirelessly communicates with base station 111. As indicated by the arrow, UE 101 crosses the tracking area boundary. UE 101 is in idle mode during the boundary crossing. UE 101 then wirelessly communicates with base station 113 to perform a Tracking Area Update (TAU).

UE 101 transfers a TAU request to network controller 121 over base station 113. Network controller 121 receives the TAU request from UE 101 which indicates the idle-mode handover from the source tracking area served by base station 111 to the target tracking area served by base station 113. In response to the TAU request, network controller 121 transfers an authorization request indicating the target tracking area to authorization database 122. Authorization database 122 processes the authorization request for UE 101 to use the target tracking area and returns an authorization result.

When the authorization result is positive, network controller 121 transfers a create bearer request for UE 101 to network gateway 123. Network gateway 123 establishes a new bearer for UE 101 over base station 113 responsive to the create bearer request. When the authorization result is negative, network controller 121 transfers a TAU rejection to UE 101 over base station 113, but network controller 121 does not transfer a create bearer message to network gateway 123.

In some examples, the tracking area boundary is also a Public Land Mobile Network (PLMN) boundary. Thus, base stations 111-112 serve a different PLMN than base station 113. The tracking area identifier typically indicates its corresponding PLMN. Thus, UE 101 also moves from a source PLMN served by base station 111 to a target PLMN served by base station 113. UE 101 indicates the target PLMN in the TAU to base station 113 and network controller 121. Network controller 121 indicates the target PLMN in the authorization request. To authorize the tracking area, authorization database 122 authorizes UE 101 to use the target PLMN. Thus, authorization database 122 issues positive and negative authorization results for tracking areas based on the UE's rights to use the target PLMNs.

Advantageously, the network gateways do not build bearers for UEs in unauthorized tracking areas and PLMNs. In addition, UEs receives their TAU rejections promptly and may take early remedial action. In densified networks with macro-cell base stations and wireless relays (pico-cell and femto-cell base stations), the overlay of tracking areas and PLMNs becomes complex. Network controller 121 efficiently and effectively handles idle-mode handovers for UEs in these difficult densified environments.

Figure 2:
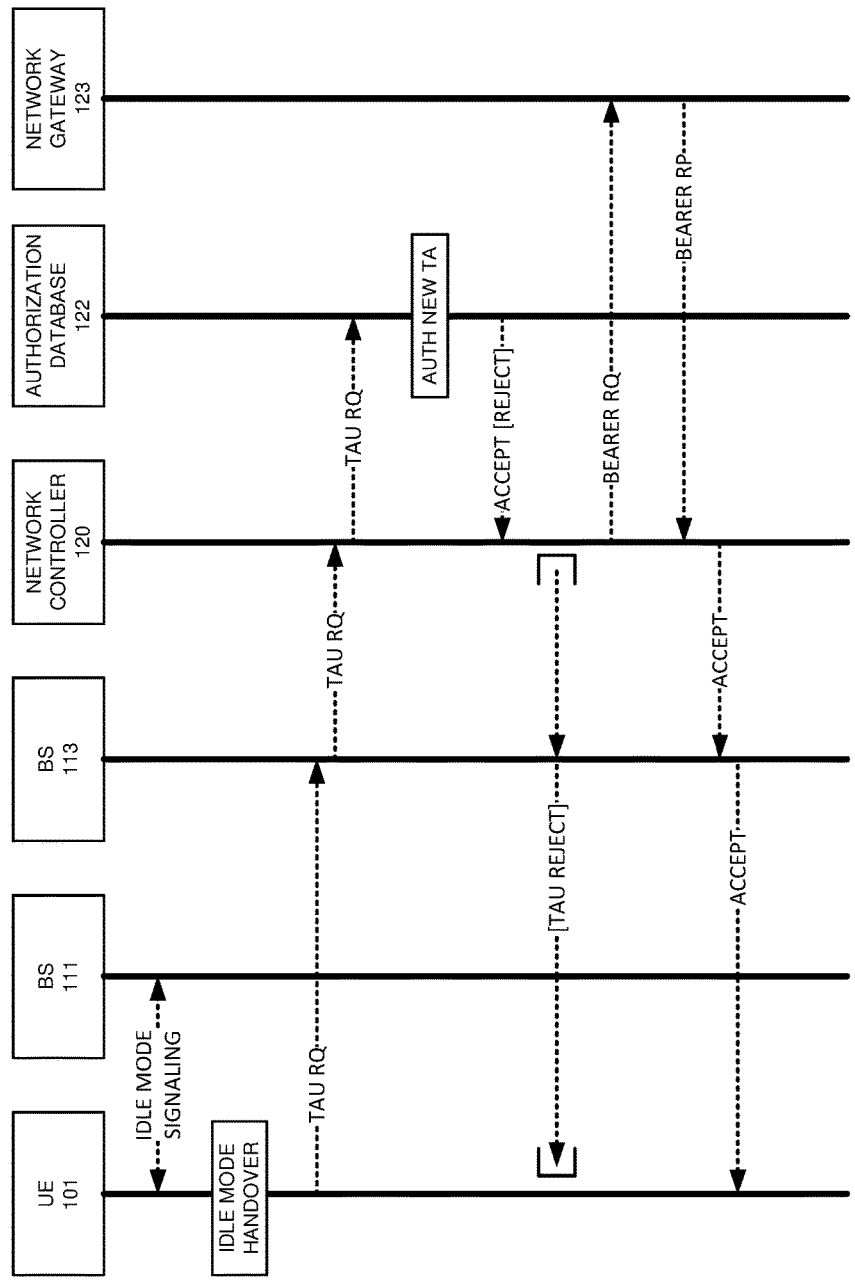
FIG. 2 illustrates the operation of the wireless data communication network to control an idle-mode handover for the UE.

FIG. 2 illustrates the operation of wireless data communication network 100 to control an idle-mode handover for UE 101. UE 101 exchanges idle-mode signaling with base station (BS) 111 in a source tracking area. UE 101 performs an idle-mode handover to base station 113—typically in response to UE movement, but other handover triggers could be used. Responsive to the idle-mode handover into the different tracking area, UE 101 transfers a TAU request (RQ) to network controller 121 over base station 113. Network controller 121 transfers a corresponding authorization request to authorization database 122. Authorization database 122 processes the authorization request for UE 101 to use the target tracking area. For example, authorization database 122 may access a data structure that correlates UE 101 with positive access rights and/or negative access rejections for several different tracking areas and/or PLMNs.

Authorization database 122 returns an authorization result that indicates TAU acceptance or rejection. As indicated on the figure by the brackets, network controller 121 would send a TAU rejection for the target tracking area to UE 101 over base station 113 responsive to a TAU rejection from authorization database 122. In this example, the authorization result is positive, so authorization database 122 sends a TAU acceptance to network controller 121. Responsive to the TAU acceptance, network controller 121 transfers a create bearer request for UE 101 to network gateway 123. Network gateway 123 establishes a new bearer for UE 101 over base station 113 responsive to the create bearer request.

Figure 3:
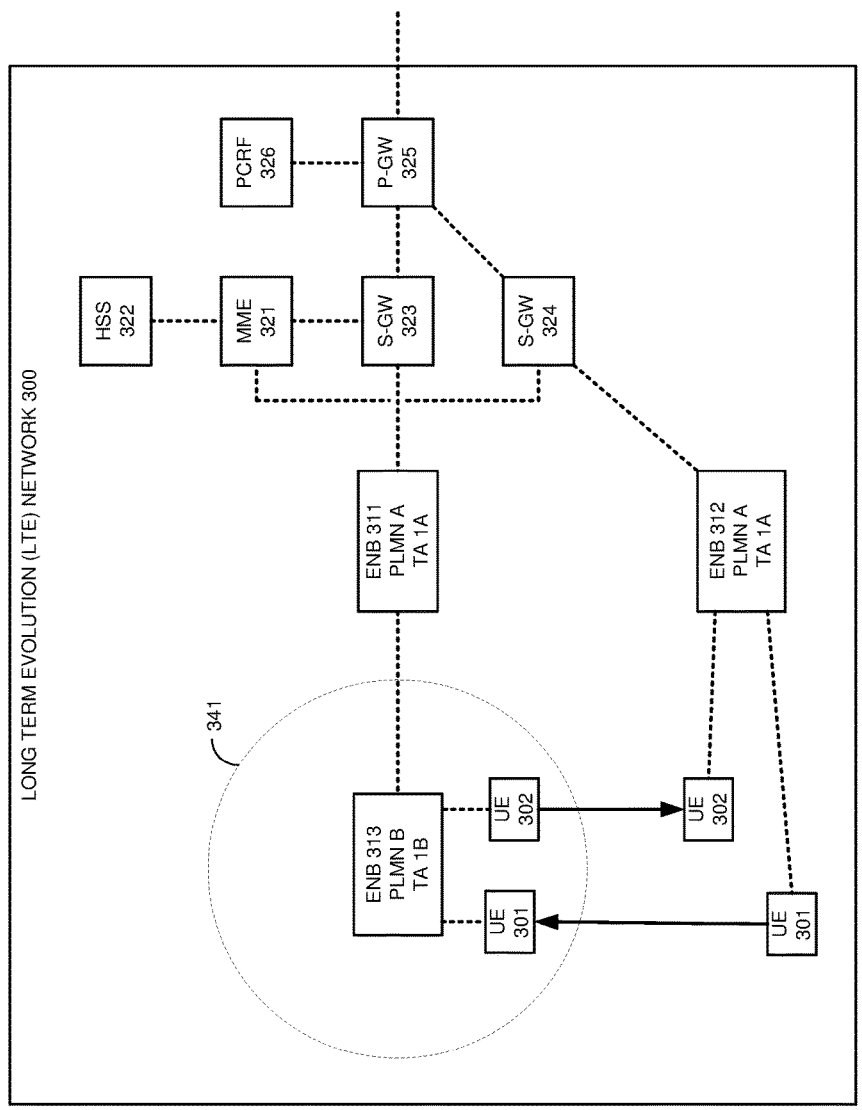
FIG. 3 illustrates a Long Term Evolution (LTE) network to control an idle-mode handover for a UE.

FIG. 3 illustrates Long Term Evolution (LTE) network 300 to control an idle-mode handover for UEs 301-302. LTE network 300 comprises evolved Node Bs (ENB) 311-313, Mobility Management Entity (MME) 321, Home Subscriber System (HSS) 322, Serving Gateways (S-GWs) 323-324, Packet Data Network Gateway (P-GW) 325, and Policy Charging and Rules Function (PCRF) 326.

ENBs 311-312 comprise macro-cell base stations. ENB 313 comprises a femto-cell wireless relay. Macro ENBs 311-312 serve Public Land Mobile Network (PLMN) A in Tracking Area (TA) 1A. Femto ENB 313 serves PLMN B in TA 1B. Femto ENB 313 has wireless communication coverage area 341.

Initially, UE 301 communicates with ENB 312 that serves PLMN A. As indicated by the arrow, UE 301 crosses the TA boundary to ENB 313 that serves PLMN B. UE 301 is in idle-mode during the handover across the TA boundary formed by coverage area 341. Responsive to the TA boundary crossing, UE 301 communicates with ENB 313 to perform a TA Update (TAU). UE 301 transfers the TAU request to MME 321. The TAU request indicates the idle-mode handover from source PLMN A to target PLMN B.

In response to the TAU request, MME 321 transfers a TAU request indicating UE 301 and target PLMN B to HSS 322. HSS 322 processes the TAU request for UE 301 to use target PLMN B and returns a TA authorization result. When the TA authorization result is positive, MME 321 transfers a create bearer request for UE 301 to S-GW 323, and S-GW 323 establishes a new bearer for UE 301 over ENB 313. S-GW 323 interacts with P-GW 325 to establish the bearer for UE 301 through ENB 313, ENB 311, SGW 323, and P-GW 325. When the TA authorization result is negative, MME 321 transfers a TAU rejection to UE 301 over ENB 313, but MME 321 does not transfer a create bearer message to S-GW 323.

UE 302 initially communicates with ENB 313 that serves PLMN B. As indicated by the arrow, UE 302 crosses the TA boundary formed by coverage area 341 to ENB 312 and PLMN A. UE 302 is in idle mode during the handover across the TA boundary. UE 302 then communicates with ENB 312 to perform a TAU. UE 302 transfers the TAU request to MME 321 for the idle-mode handover from source PLMN B to target PLMN A.

In response to the TAU, MME 321 transfers a TAU request indicating UE 302 and target PLMN A to HSS 322. HSS 322 processes the TAU request for UE 302 to use target PLMN A and returns a TA authorization result. When the TA authorization result is positive, MME 321 transfers a create bearer request for UE 302 to S-GW 324, and S-GW 324 establishes a new bearer for UE 302 over ENB 312. S-GW 324 interacts with P-GW 325 to establish the bearer for UE 302 through ENB 312, SGW 324, and P-GW 325. When the TA authorization result is negative, MME 321 transfers a TAU rejection to UE 302 over ENB 312, but MME 321 does not transfer a create bearer message to S-GW 324.

Figure 4:
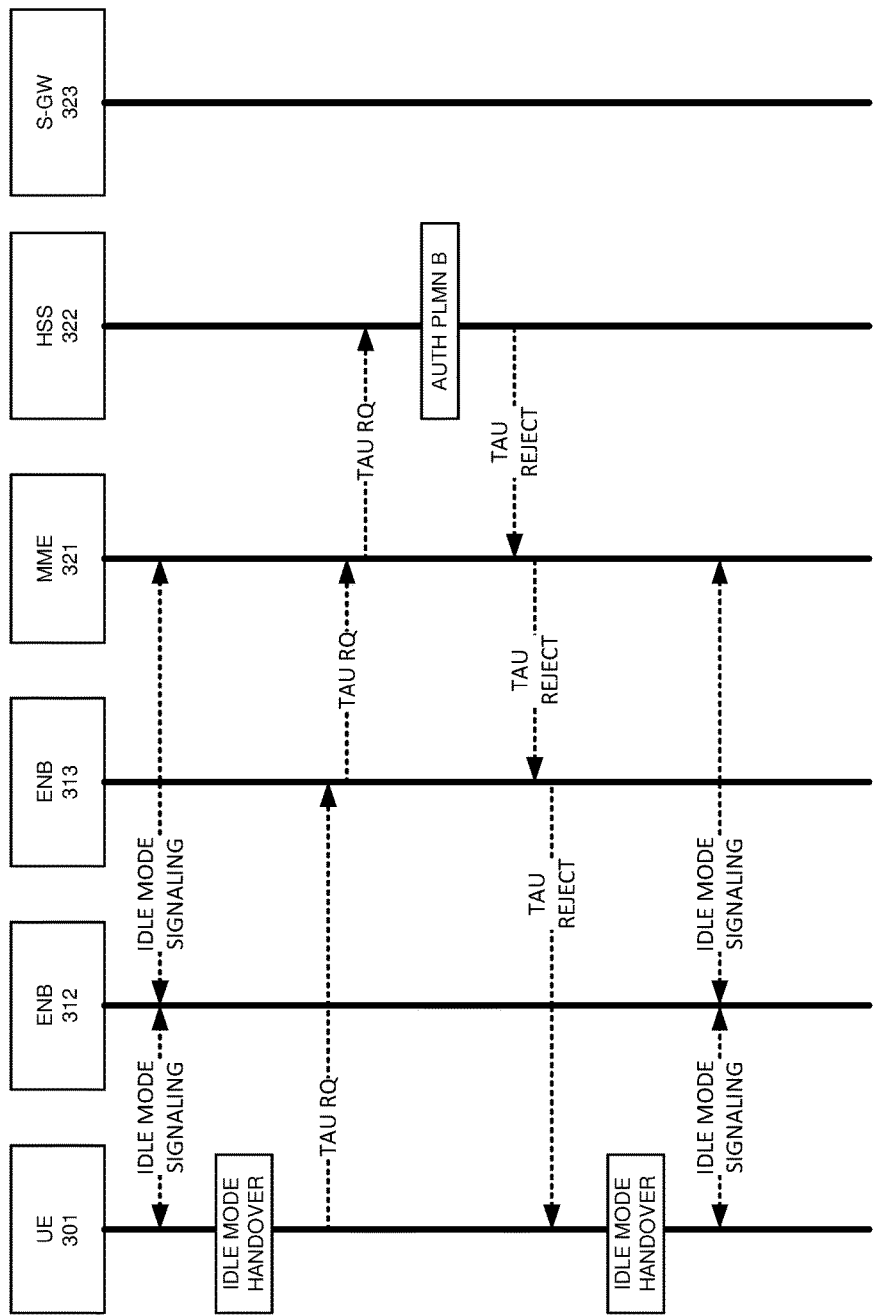
FIG. 4 illustrates the operation of the LTE network to block an idle-mode handover for a UE.

FIG. 4 illustrates the operation of LTE network 300 to block an idle-mode handover for UE 301. Initially, UE 301 exchanges idle-mode signaling with ENB 312 that serves PLMN A. During idle-mode, UE 301 crosses the TA boundary to ENB 313 that serves PLMN B. UE 301 transfers a TAU request (RQ) to MME 321 over target ENB 313. The TAU request indicates the idle-mode handover to target PLMN B.

In response to the TAU request, MME 321 transfers a TAU request indicating UE 301 and target PLMN B to HSS 322. HSS 322 processes the TAU request for UE 301 to use target PLMN B and returns a TAU rejection, because UE 301 is not authorized to use PLMN B. In response, MME 321 transfers the TAU rejection to UE 301 over ENB 313. MME 321 does not transfer a create bearer message to S-GW 323. Responsive to the TAU rejections, UE 301 goes back to ENB 312 and PLMN A to exchange idle-mode signaling.

Figure 5:
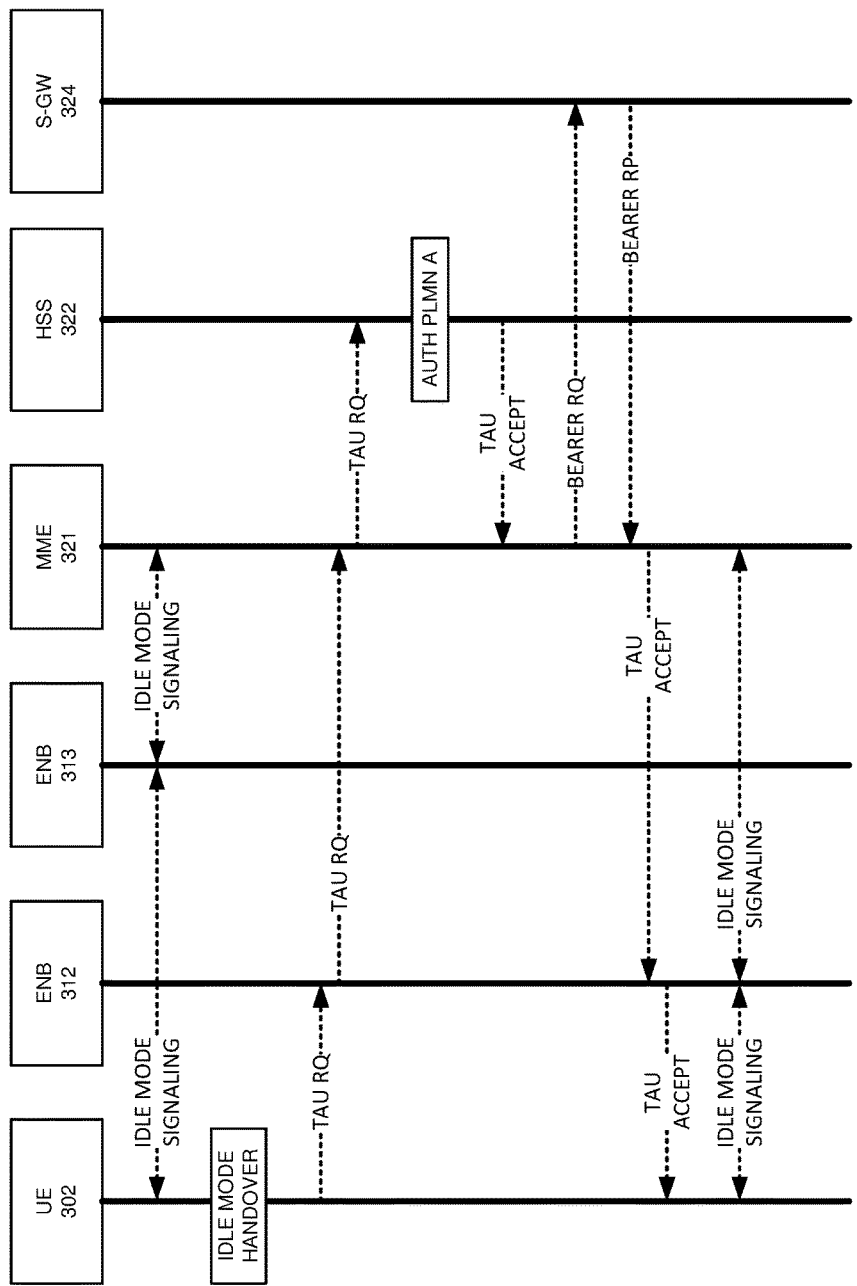
FIG. 5 illustrates the operation of the LTE network to accept an idle-mode handover for a UE.

FIG. 5 illustrates the operation of LTE network 300 to accept an idle-mode handover for UE 302. Initially, UE 302 exchanges idle-mode signaling with ENB 313 that serves PLMN B. During idle-mode, UE 302 crosses the TA boundary to ENB 312 that serves PLMN A. UE 302 transfers a TAU request to MME 321 over target ENB 312. The TAU request indicates the idle-mode handover to target PLMN A.

In response to the TAU request, MME 321 transfers a TAU request indicating UE 302 and target PLMN A to HSS 322. HSS 322 processes the TAU request for UE 302 to use target PLMN A and returns a TAU acceptance, because UE 302 is authorized to use PLMN A. In response to the TAU acceptance, MME 321 transfers a create bearer message to S-GW 324. Although not shown S-GW 323 interacts with P-GW 325 to establish the bearer for UE 302 through ENB 312, SGW 324, and P-GW 325. S-GW 324 returns a create bearer response (RP) to MME 321. MME transfers a TAU acceptance to UE 302 over ENB 312. UE 302 now exchanges idle-mode signaling with ENB 312 in PLMN A.

Advantageously, MME 321 does not build bearers for UEs in unauthorized PLMNs. In addition, UEs receives their TAU rejections promptly and may take early remedial action. In densified networks with a multitude of wireless relays, the overlay of tracking areas and PLMNs becomes complex. MME 321 efficiently and effectively handles idle-mode handovers in these difficult densified environments.

Figure 6:
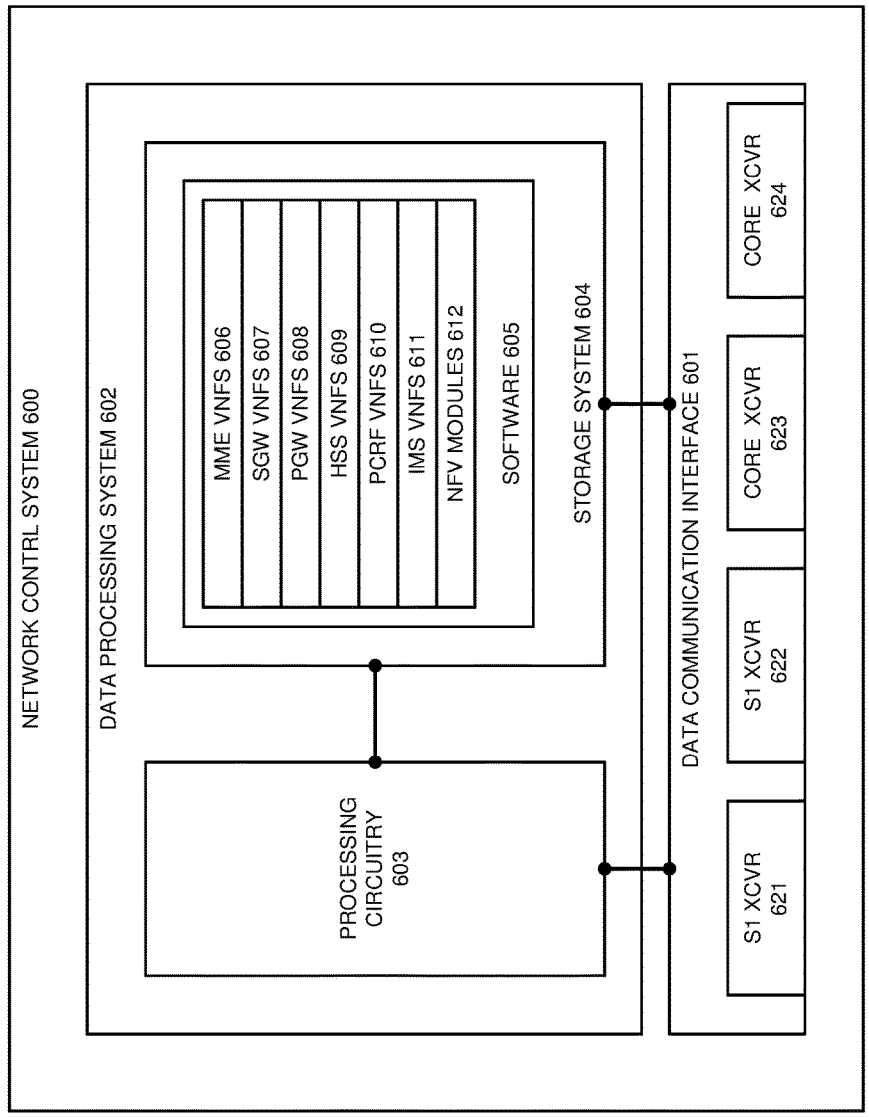
FIG. 6 illustrates a network control system to control an idle-mode handover for a UE.

FIG. 6 illustrates network control system 600 to control an idle-mode handover for a UE. Network control system 600 is an example network control system 100 and MME 321, although systems 100 and 321 may use alternative configurations and operations. Network control system 600 comprises data communication interface 601 and data processing system 602. Data communication interface 601 comprises 51 transceivers 621-622 and core transceivers 623-624. Data processing system 602 comprises processing circuitry 603 and storage system 604. Storage system 604 stores software 605. Software 605 includes respective software modules 606-612.

Transceivers 621-624 comprise communication components, such as ports, bus interfaces, signal processors, memory, software, and the like. Processing circuitry 603 comprises server blades, circuit boards, bus interfaces, integrated circuitry, and associated electronics. Storage system 604 comprises non-transitory, machine-readable, data storage media, such as flash drives, disc drives, memory circuitry, servers, and the like. Software 605 comprises machine-readable instructions that control the operation of processing circuitry 603 when executed.

Network control system 600 may be centralized or distributed. All or portions of software 606-612 may be externally stored on one or more storage media, such as circuitry, discs, and the like. Some conventional aspects of network control system 600 are omitted for clarity, such as power supplies, enclosures, and the like. When executed by processing circuitry 603, software 606-612 directs circuitry 603 to perform the following operations.

MME Virtual Network Functions (VNFs) 606 exchange signaling to handle mobility management tasks and perform TAUs to authorize UEs to use target PLMNs. S-GW VNFs 607 interact with eNodeBs and with MME VNFs 606 and P-GW VNFs 608 to establish bearers for the UEs. P-GW VNFs 608 interact with S-GW VNFs 606 and PCRF VNFs 610 to establish the bearers for the UEs. HSS VNFs 609 authorize the UEs to use the PLMNs and other data services. PCRF VNFs 610 serve policy and charging rules to P-GW VNFs 608. Internet Protocol Multimedia Subsystem (IMS) VNFs 611 exchange signaling to direct PCRF VNFs 610 to establish media paths for UEs over eNodeBs, SGW VNFs 607 and PGW VNFs 608. Network Function Virtualization (NFV) modules 612 include hypervisors or operating systems to generate the VNF execution environment in the computer hardware.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to control an idle-mode handover for User Equipment (UE), the method comprising:
   a network controller receiving a Tracking Area Update (TAU) from the UE that indicates the idle-mode handover from a source Tracking Area (TA) having a source Public Land Mobile Network (PLMN) to a target TA having a target PLMN and in response to the target PLMN, transferring an authorization request indicating the target TA and the target PMLN;
   before the idle-mode handover, an authorization database processing the authorization request to authorize the UE to use the target PLMN and returning a TA authorization result;
   when the TA authorization result is a TAU acceptance, the network controller performing the idle-mode handover by establishing a default data bearer for the UE in the target TA having the target PLMN; and when the TA authorization result is a TAU rejection, the network controller blocking the idle-mode handover by not establishing the default data bearer for the UE in the target TA having the target PLMN.

2. The method of claim 1 wherein the source PLMN is served by a macrocell base station.

3. The method of claim 1 wherein the target PLMN is served by a femtocell base station.

4. The method of claim 1 wherein the target PLMN is served by a wireless relay.

5. The method of claim 1 wherein the network controller comprises a Long Term Evolution (LTE) Mobility Management Entity (MME).

6. The method of claim 1 wherein the authorization database comprises a Long Term Evolution (LTE) Home Subscriber System (HSS).

7. The method of claim 1 wherein the network gateway comprises a Long Term Evolution (LTE) Serving Gateway (S-GW).

8. A wireless communication network to control an idle-mode handover for User Equipment (UE) comprising:
   a network controller configured to receive a Tracking Area Update (TAU) from the UE that indicates the idle-mode handover from a source Tracking Area (TA) having a source Public Land Mobile Network (PLMN) to a target TA having a target PLMN and in response to the target PLMN, transfer an authorization request indicating the target TA and the target PMLN;
   before the idle-mode handover, an authorization database configured to process the authorization request to authorize the UE to use the target PLMN and return a TA authorization result;
   when the TA authorization result is a TAU acceptance, the network controller is configured to perform the idle-mode handover by establishing a default data bearer for the UE in the target TA having the target PLMN; and
   when the TA authorization result is a TAU rejection, the network controller is configured to block the idle-mode handover by not establishing the default data bearer for the UE in the target TA having the target PLMN.

9. The wireless communication network of claim 8 wherein the source PLMN is served by a macrocell base station.

10. The wireless communication network of claim 8 wherein the target PLMN is served by a femtocell base station.

11. The wireless communication network of claim 8 wherein the target PLMN is served by a wireless relay.

12. The wireless communication network of claim 8 wherein the network controller comprises a Long Term Evolution (LTE) Mobility Management Entity (MME).

13. The wireless communication network of claim 8 wherein the authorization database comprises a Long Term Evolution (LTE) Home Subscriber System (HSS).

14. The wireless communication network of claim 8 wherein the network gateway comprises a Long Term Evolution (LTE) Serving Gateway (S-GW).

* * * * *